(12) United States Patent
Cheedella et al.

(10) Patent No.: US 7,337,176 B1
(45) Date of Patent: Feb. 26, 2008

(54) DATA LOADING TOOL FOR LOADING A DATABASE

(75) Inventors: Rajendra P. Cheedella, Overland Park, KS (US); Nagendra Mahadevappa, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 436 days.

(21) Appl. No.: 10/652,264

(22) Filed: Aug. 29, 2003

(51) Int. Cl.
*G06F 17/00* (2006.01)
*G06F 17/30* (2006.01)

(52) U.S. Cl. ........................................ 707/100; 707/10
(58) Field of Classification Search .............. 707/1–10, 707/100–104.1, 200–205
See application file for complete search history.

(56) References Cited

U.S. PATENT DOCUMENTS

| | | | |
|---|---|---|---|
| 5,920,722 A | 7/1999 | Damron | 395/706 |
| 6,249,886 B1 | 6/2001 | Kalkunte | 714/47 |
| 6,449,739 B1 | 9/2002 | Landan | 714/47 |
| 6,581,052 B1 * | 6/2003 | Slutz | 707/2 |
| 6,662,312 B1 * | 12/2003 | Keller et al. | 714/38 |
| 6,985,901 B1 * | 1/2006 | Sachse et al. | 707/10 |
| 2003/0212986 A1 * | 11/2003 | Nelin et al. | 717/124 |
| 2004/0024790 A1 * | 2/2004 | Everett | 707/200 |
| 2005/0289524 A1 * | 12/2005 | McGinnes | 717/140 |

OTHER PUBLICATIONS

Alfredo Edwin Gunara, et al., *Simulator Tool For Testing Software In Development Process*, Filing Date—Aug. 18, 2003, U.S. Appl. No. 10/643,328, Specification (32 pgs.) and Drawings (8 sheets).
Balagurunathan Balasubramanian, et al., *Method and Software for Testing and Performance Monitoring*, Filing Date—May 31, 2001, U.S. Appl. No. 09/871,204, Specification (43 pgs.) and Drawings (12 sheets).

* cited by examiner

*Primary Examiner*—Hosain Alam
*Assistant Examiner*—Navneet K Ahluwalia (57) ABSTRACT

A data loading tool for loading a target database is provided. The data loading tool includes an initialization component operable to utilize data and a key of a first table of a database to generate a load file identifying related keys and associated data in the database. The data loading tool further comprises a control generator, an extractor component and a loader component. The control generator is operable to generate at least one control file related to the database. The extractor component is operable to extract data from the database based on the load file and the loader component is operable to load the data extracted by the extractor component into the target database utilizing the at least one control file. A method for loading a target database is provided.

19 Claims, 4 Drawing Sheets

DATA LOADING TOOL FOR LOADING A DATABASE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates generally to the field of data loading and more specifically, but not by way of limitation, to a data loading tool for loading a database in a test environment.

BACKGROUND OF THE INVENTION

Newly developed software programs and applications are tested to ensure they operate as intended. Frequently, test data is provided to test the data handling aspects of the new software. Realistic test data is more useful than arbitrary data and generally used prior to placing the newly developed software or applications into production. Obtaining realistic test data presents difficult and time-consuming challenges for software development.

The test data may be provided obtained in a number of manners. For example, a duplicate or copy of the entire business database can made and stored to an area safe for testing. Due to the size of many business databases, however, copying the entire database may be time-consuming and an inefficient use of system resources. Obtaining small amounts of data from complex relational databases can be a significant undertaking, given the nature of such databases. For example, the desired testing data must first be identified and then the portions of the tables in the database maintaining the desired data must then be copied to a test database. Each database table may have numerous support files which must be created and kept synchronized. Also, maintaining the relational integrity of the tables and key structures in complex relational databases, while obtaining the desired data for testing, is a time-consuming and complex process every time new test data is required for newly developed software and applications.

SUMMARY OF THE INVENTION

According to one embodiment, the present disclosure provides a data loading tool for loading a target database. The data loading tool includes an initialization component operable to utilize data and a key of a first table of a database to generate a load file identifying related keys and associated data in the database. The data loading tool further comprises a control generator, an extractor component and a loader component. The control generator is operable to generate at least one control file related to the database. The extractor component is operable to extract data from the database based on the load file and the loader component is operable to load the data extracted by the extractor component into the target database utilizing the at least one control file.

According to another embodiment, the present disclosure provides a method of loading a target database. The method includes providing a portion of data related to data desirably loaded in the target database and providing a table list identifying a plurality of tables of a database maintaining data to be extracted. The method includes providing a first key name related to one of the plurality of tables maintaining the portion of data.

The method includes generating a load file including at least a second key name and a second portion of data associated with a second table of the plurality of tables of the database by utilizing a relational aspect of the plurality of tables of the database. The method includes generating a control file based on the database and a data file, extracting data from the database to the data file utilizing the load file, and loading the data from the data file to the target database utilizing the control file and the table list. According to one embodiment, a method of testing an application using the test database is provided.

According to yet another embodiment, the present disclosure provides a data loading tool for loading data to a test database. The data loading tool comprising a tables list, an initialization component, an extractor component, a control generator and a loader component. The table list identifying at least some of the tables of the database maintaining data. The initialization component operable to generate a load list including a table name related to a table of the database, a key name related to a key of the table and a portion of data associated with the key by utilizing the key and the portion of data to identify a second key and a second portion of data in the table associated with another key and another portion of data in another table of the database base on relationships of the database.

The control generator generates at least one control file based on a structure of the database. The extractor component utilizes the load list to extract data from the database to a data file. The loader component loads data, based on the load list and utilizing the at least one control file, from the data file to the test database.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence.

The present disclosure should in no way be limited to the exemplary implementations, drawings, and techniques illustrated below, including the exemplary design and implementation illustrated and described herein, but may be modified within the scope of the appended claims along with their full scope of equivalents.

Figure 1:
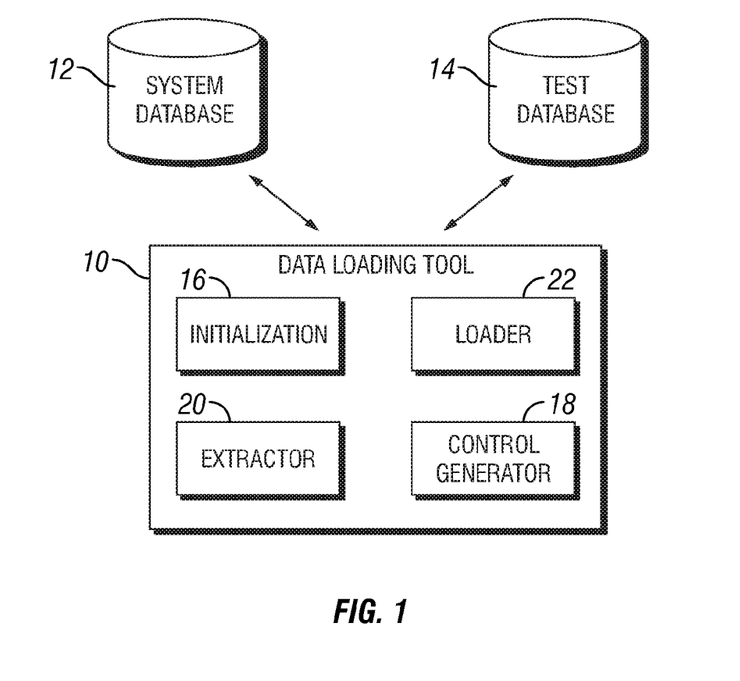
FIG. 1 is a block diagram of a data loading tool for loading a target database, according to one embodiment.

FIG. 1 is a block diagram illustrating one embodiment of the data loading tool 10 for loading data from a system database 12 to a test database 14. The system database 12, in the present embodiment, is a relational database, such as an ORACLE or other relational database, which is accessible utilizing various techniques, including structured query language (SQL). The system database 12, according to other embodiments, may be any database, datastore or file system comprising one or more files or tables for storing data for access by computer programs, software or applications.

The system database 12 and test database 14 may be stored using any common storage manner, such as on magnetic, optical or other storage devices for storing data currently employed or developed hereafter. The test database 14 may be of the same type of database or file system as the system database 12, while in other embodiments the test database 14 may be a database or file system of a different type, format, data or file structure than that of the system database 12, which may be necessitated by the location of the data desirable for testing, the format of the data required for the application being tested, or otherwise.

Where the system database 12 and test database 14 are relational databases, the system database 12 and test database 14 may comprise a plurality of tables or files each having a plurality of fields or headings some of which may be referred to as indexes or keys. In a relational database environment the tables may be provided with a primary key, a secondary key and other keys corresponding to indexes or keys used in related tables for organizing data in a manner where it is readily accessible, efficiently stored for easy access for reading and writing the data.

The system database 12 as described herein may be referred to as a production database that maintains actual business data used in the daily operations of the business. The system database 12, however, may also include data that is maintained strictly for testing purposes, a portion of which may be loaded into the test database 14 for testing new software and applications developed for the business enterprise system.

The data loading tool 10, in the present embodiment, is employed as a computer application or software operable on a computer system (not shown) employing an operating system, such as, but not limited to, Unix. The computer system may be provided with a storage device wherein the system database 12 and test database 14 may or may not be stored. In other embodiments, the data loading tool 10 may be provided on a computer in a network or mainframe environment such that the system database 12, test database 14 and the data loading tool 10 are provided on the same or different systems and/or storage devices dispersed across a network. The term network is not intended to be limiting and may include, for example, from small peer-to-peer networks to large enterprise networks. Other computer systems and architectures wherein the data loading tool 10 is usefully employed will readily suggest themselves to one of ordinary skill in the art in view of the present disclosure and are within the spirit and scope as disclosed and claimed herein.

The data loading tool 10, in one embodiment, includes an initialization component 16 operable to utilize data and a key of a first table of the system database 12 to generate a load file (not shown) that identifies related keys and associated data in the system database 12. The data loading tool 10 also includes a control generator 18 operable to generate at least one control file (not shown) related to the system database 12 for loading the test database 14. The data loading tool 10 includes an extractor component 20 operable to extract data from the system database 12 based on the load file. A loader component 22 of the data loading tool 10 is operable to load the data extracted by the extractor component 20 into the test database 14 utilizing at least one of the control files. Construction and operation of the load file, control files and subsystems will be described hereinafter in greater detail.

It should be appreciated that references made herein to receiving or obtaining data or information are intended to include, but not be limited to, information received from a graphical user interface, which will be described and disclosed hereinafter, but also include communication between sub-system components, as well as communication from other systems. References to writing, outputting, generating or creating data or output include, but should not be limited to, information and data read from or stored to files or databases on storage devices, as well a standard input-output devices, computation and processing accomplished by system processors, which are well known in the art. The files created may be standard text files, ASCII files, database or other system files or tables in any desirable format or configuration.

Figure 2:
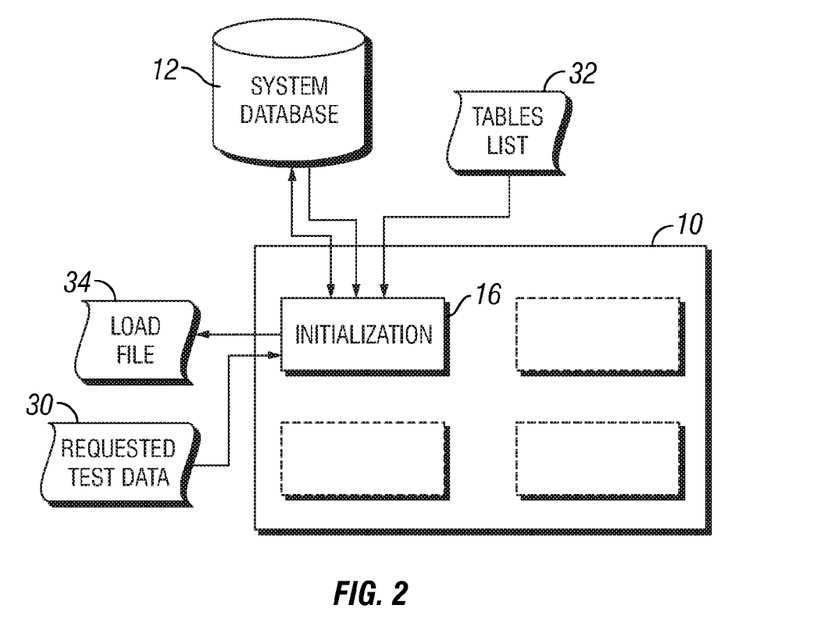
FIG. 2 is a block diagram illustrating one embodiment of an initialization component of the data loading tool.

FIG. 2 is a diagrammatic illustration of one embodiment of the initialization component 16 of the data loading tool 10. The initialization component 16, according to the present embodiment, obtains test data related information, such as but not limited to, identifiers of data that is desirable or useful for testing the newly developed software or applications. Such identifiers may include, for example, data ranges, index ranges, customer numbers, dates of customer orders, geographical data. In the present example, customer identification sequence numbers that are the primary or other key for the relational database of the system database 12 are used. The primary key identifier would, for example, identify a single record or records in the system database 12 for a particular transaction, customer, or event. A plurality of data identifiers relate to a plurality of data records or ranges of transactions based on the date, time or sequence, for example, which may be useful to test the newly developed application.

In the present illustration, the initialization component 16 receives requested test data 30, which may include a customer identification sequence number, for example, and the key field of a table in the system database 12 related thereto. In some embodiments, the requested test data 30 may include only the requested customer data, for example, while in other embodiments only the key field may be provided. In some embodiments the initialization component 16 may include or be provided with a list of database keys or indexes related to the relationships of the various tables in the system database 12 for the purposes described hereinafter.

The initialization component 16 further obtains or has access to a tables list 32 identifying tables or files of the system database 12. In one embodiment, the tables list is provided in a standard text file wherein the tables may each be listed on a separate line. It will be appreciated that in some instances a complete list of the tables may not be necessary and that a partial list of the tables of the system database 12 may be sufficient.

The initialization component 16 reads the first table from the tables list 32 and the primary key obtained from the requested data 30 to position in first table in the system database 12. The initialization component 16 searches the first table by the primary key to locate the desired test data, obtained by the requested test data 30. Thereafter, the initialization component 16 refers to the keys list, described hereafter, to identify other key fields, such as secondary key of the first table. The initialization component 16 then reads the data in the secondary key field and reads the next table from the tables list 32, locating additional data relationally related to other tables in the system database 12. Based upon the type of database and/or file system utilized, the tables list 32 may be required to identify the relationship, such as parent/child relationship of the various tables. This relationship may be identified by the order in which the tables are listed in the tables list 32 or otherwise.

The initialization component 16 continues this process through the tables listed on the tables list 32 until all of the tables, key fields, and related data have been identified. The initialization component 16 then outputs, to a load file 34, a record of the table, related key field, and specific data identified. The load file 34 may maintain the record in particular order related to maintain the relational integrity of the system database 12, similar to that discussed with respect to the order in which the tables are listed in the tables list 32.

The keys list (not shown) identifies one or more key fields or indexes related to the system database 12. The keys list is provided in a script file, in the present embodiment, while in other aspects, the keys list is obtained in other manners or is derived from the relational nature of the system database 12.

In this manner, a record of the table and key, along with corresponding data, for each record of test data desirable for testing is provided in the load file 34 in an order sufficient to easily recreate the data while maintaining the relational integrity of the system database 12. It will be appreciated that in some aspects, the load file 34 may include a single item of data, such a specific customer number, for each key in a table, while in other aspects, numerous desired data items may be provided. In still other embodiments, the specific data may be provided in ranges whereby ranges of data within particular tables may be loaded into the test database 14. Depending upon the desired data, the load file 34 may include operands or indicators, such as script file functions, to alert the data loading tool 10 that a range of data, for example, is to be loaded.

Figure 3:
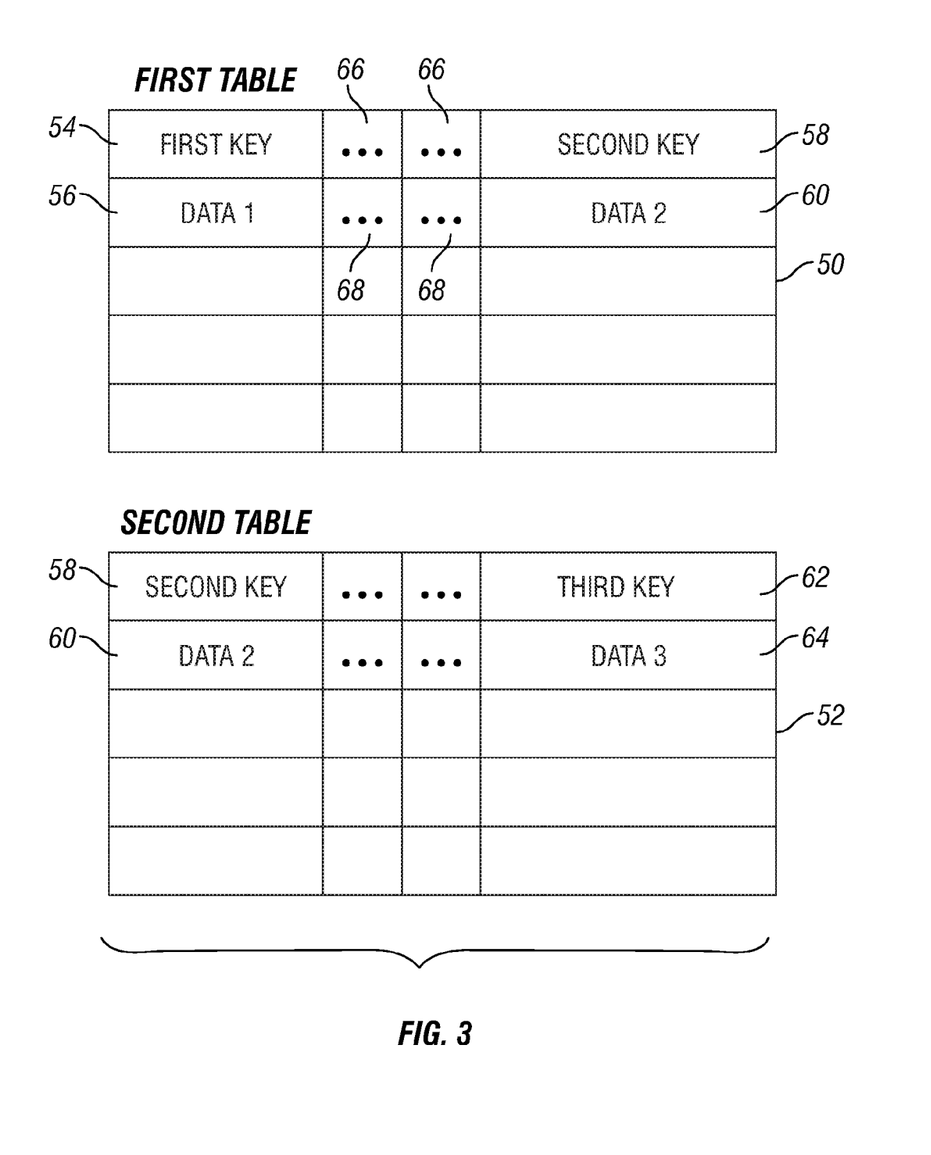
FIG. 3 illustrates a first and a second table of a system database as accessed by the data loading tool.

FIG. 3 illustrates a first table 50 and a second table 52, which are examples of tables or files employed in relational databases, such as the system database 12. The first table 50 includes a first key 54 which is a field or heading in the table and, in this example, illustrates a primary key of the first table 50. A data1 56 is illustrative of data that is provided in the first table 50 under the first key 54, such as the data that is requested for testing purposes.

In order to obtain data related to the particular record, such as a customer record, or business record, the initialization component 16 utilizes the requested test data 30, as described above. Provided with the primary key, such as the first key 54, and table name, such as the first table 50, the initialization component 16 searches the key field for the specific record, such as data1 56. The initialization component 16 then refers to a keys list to identify a second key 58, which may be referred to as a secondary key of the first table 50. By associating this secondary key or second key 58 of the first table 50 with the data1 56, the initialization component 16 readily locates a data2 60 related to the requested data.

The initialization component 16 references the tables list 32 to identify the next table, such as the second table 52. Based on the relational nature of the tables, the second key 58 is, for example, the primary key of the second table 52. By referring to the keys list of keys associated with the system database 12, the initialization component 16 identifies a third key 62. The initialization component 16, using the location of the data2 60 and based on the third key 62 in the second table 52, identifies a data3 64. In this manner, the initialization component 16 identifies primary keys or indexes for the plurality of tables list and the location in each of the plurality of tables of the system database 12 wherein the requested data is located. The requested data may be identified under headings 66 of the first table in additional cells or locations 68. The data located in the cells or fields 68 can be readily extracted from the system database 12 once it has been identified in this manner. Extraction of the data will be discussed hereinafter in greater detail.

The initialization component 16 may be programmed utilizing a java script employing structured query language (SQL) calls to the system database 12. In other embodiments however, the initialization component 16 be programmed for this functionality using a number of other programming techniques and technologies which will readily suggest themselves to one of ordinary skill in the art in view of the present disclosure.

Figure 4:
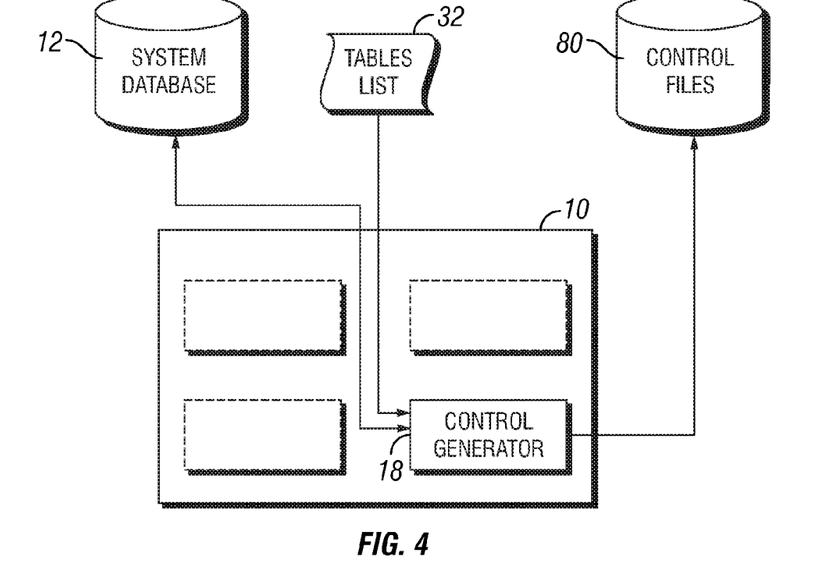
FIG. 4 is a block diagram illustrating one embodiment of a control generator of the data loading tool.

FIG. 4 is a block diagram illustrating the control generator 18 in accordance with one embodiment. The control generator 18 utilizes the tables list 32 and obtains relevant information from the system database 12, such as the type of database, file structures, tables and other information necessary to prepare the data loading tool 10 to extract and/or load data from the system database 12 to the test database 14. The control generator 18, according to one embodiment, may be a Unix batch or script file which reads the tables list 32 and creates control files 80. The control files 80 may include a plurality of files such as, but not limited to, a data file to which data from the system database 12 will be extracted, control files for creating the necessary target database 14 files, description files related to the system database 12 and any other files that may be useful to promote the extraction and loading of data between the system database 12 and test database 14.

The control generator 18, reading the tables list 32, creates the control files 80 by identifying each table and creating the desired files. The control files 80 are named based on the name of the table read from the tables list 32, for example, by appending the appropriate extension, such as .ctl, bad, .dat, .des to the table name. The control generator continues this process until all the control files 80 necessary for creating the target database 14 have been generated. It will be appreciated that the extensions and type of files created, including the content, such as header information, of the created files will vary depending upon the particulars of the system database 12 and desired target database 14.

Figure 5:
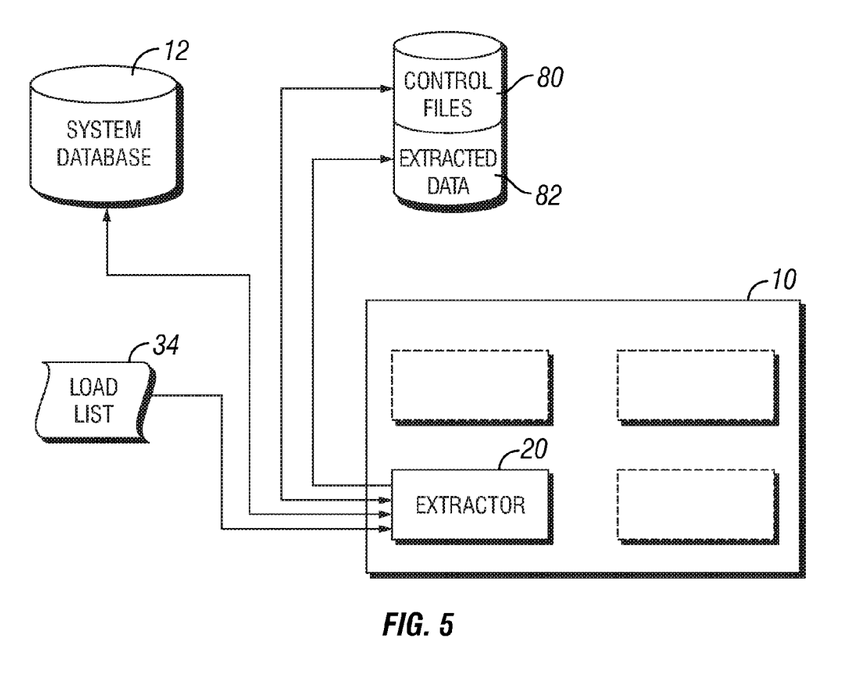
FIG. 5 is a block diagram illustrating one embodiment of an extractor component of the data loading tool.

FIG. 5 is a diagrammatic illustration of the extractor component 20 according to one embodiment of the data loading tool 10. The extractor component 20 is operable to extract data from the system database 12. The extractor 12 may be a program, software or script file, such as a Unix script file provided with structured query language (SQL)

calls to the system database 12. The extractor component 20 utilizes the load list 34, which includes the table names, the keys associated with the table and the specified data to extract from the system database 12, to extract the desired data from the system database 12.

In one embodiment, the extractor component 20 utilizes the control files 80 to accomplish the data extraction from the system database 12. While in other embodiments the control files 80 generated by the control generator 18 may not yet have been generated by the control generator 18. In either event, the extractor 20 extracts the data from the system database 12 and places the extracted data 82 into a file, such as a flat file under the table name .dat extension. A Unix script or other program or computer instructions, combined with the database information provided in the load list 34, may be sufficient to extract the desired data from the system database 12.

It is readily apparent that the extractor component 20, utilizing the load list 34, is operable for extracting the data, such as the extracted data 82, and may be accomplished rapidly without the need for individuals to manually locate and copy the desired testing data from the system database 12. Furthermore the extracted data 82, in some instances, may comprise a significantly smaller amount of data than the large amount of data which may be maintained by the system database 12, providing a more efficient use of system resources as compared with copying the entire system database 12.

Figure 6:
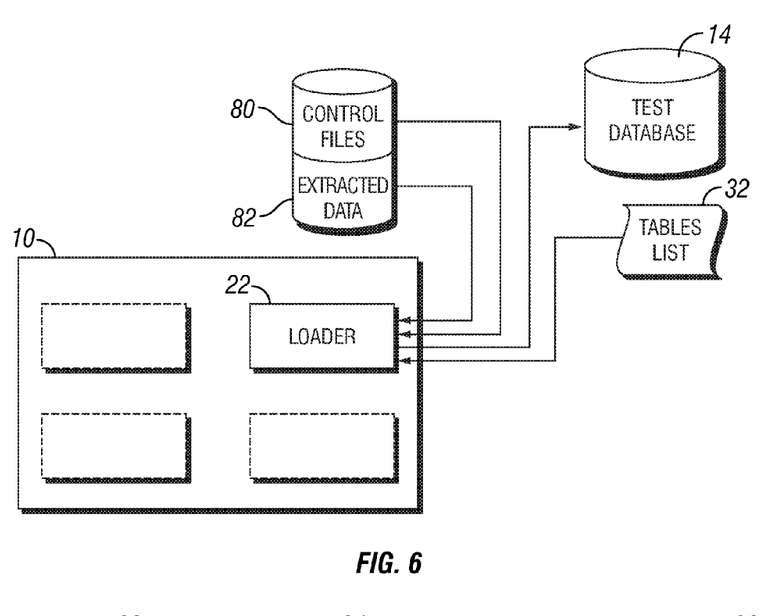
FIG. 6 is a block diagram illustrating one embodiment of a loader component of the data loading tool.

FIG. 6 illustrates the loader component 22 for loading the extracted data 82 to the test database 14. The loader component 22 may be implemented as a Unix script or batch file, or other software or computer instructions operable for these purposes. The loader 22 communicates with the tables list 32 to identify the control files 80 previously generated by the control generator 18. The loader 22 loads the test database 14 with the extracted data 82, which is accomplished in the present embodiment uses structured query language (SQL) calls. In other embodiments, where the system database 12 and test database 14 are relational databases or other datastores, other techniques may be used, as previously discussed.

In some cases, the loader 22 may employ additional scripts or text files having SQL calls so that the extracted data 82 is loaded into portions of the control files 80. For example, the control files 80 may be database files or tables that include the data structures, but are void of data. In this case, the extracted data 82 is loaded into the control files 80 which are then referred to as the target database 14. In some embodiments, the loader 22 references the load file 34 for additional information related to the loading procedure. Loading procedure information may be useful so that data which is redundant to the control files 80, tables list 32 and load list 34 may be eliminated or reduced.

In a business environment, the security and the integrity of the system database 12 including the data content may be of paramount concern. In these instances, the structured query language calls, for example, and/or the script files or other programs or routines calling the system database 12, may include passwords, user identifiers, and any other control information authorizing access to the system database 12 and tables. Furthermore, for additional security, the data loading tool 10 may be programmed wherein only read access to the system database 12 is permitted, while write access is permissible on the target or test side in generating the test database 14.

Although the initialization component 16, control generator 18, extractor component 20 and loader component 22 are illustrated and described as separate components for the present disclosure, in other embodiments, the components may be further separated or the components may be combined in a different manner or combined into a complete subsystem, script, program or routine. Also, additional subroutines or subsystems may be provided based upon the nature of the system database 12 and test database 14 being created such as, but not limited to, creating a package on the source database, such as the system database 12, to permit the creation of SQL scripts out of the source database. Such a package creation component (not shown) may be employed as a script or program operable to create such packages and SQL scripts out of the source database.

The tables are listed in the tables list 32 based upon the relationships of the table to the database, such as parent/child relations. The tables may be listed, in other embodiments, in various arrangements or formats to accommodate the nature of database or datastore employed. The control generator 18, the extractor component 20, and the loader component 22 are reusable components. Thus, the data loading tool 10 may be usefully employed in a number of different database environments by simply selecting details of the database and providing the desired data. In this manner, the data loading tool 10 can be employed for loading test data without the need to create customized scripts and/or programs for every test data load instance. In some aspects, the fields of each table to be loaded into the test database 14 is be provided so that only the desired fields or portions of tables are loaded into the test database 14.

Figure 7:
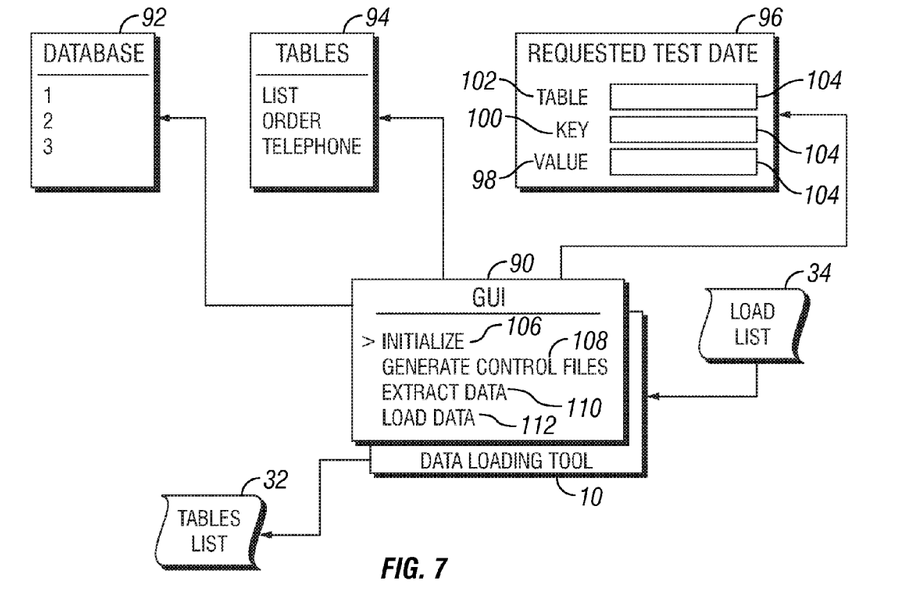
FIG. 7 is a graphical user interface employed by the data loading tool, according to one embodiment.

FIG. 7 illustrates one embodiment of a graphical user interface 90 useful to promote interaction by users of the data loading tool 10. It should be understood, however, that the data loading tool 10 may be implemented using programs or scripts run from a Unix command line, for example. The graphical user interface 90 may be useful for user input of certain data and operations and promote the ease of operation of the data loading tool 10. For example, when the data loading tool 10 is employed in an environment where a number of databases are available, a first user interface 92 may be provided to identify the system databases from which the user can select. In this manner, the data loading tool 10 is provided with functionality to search, identify and subsequently display the databases resident on the system or enterprise network from which the user can select.

The graphical user interface 90 also provides a second user interface 94 identifying the tables or files related to the selected database. The data loading tool 10 is operable to search the selected database and display the related tables or files. From the second user interface 94, the user may operably select all of the tables related to the database or the tables associated with the data desirably used for testing any newly developed software. The second user interface 94, in some embodiments, describes the relationships, such as the database entity relationships, key fields, and indexes related to the database necessary for employing the data loading tool 10 as previously discussed.

The graphical user interface 90 also includes a third user interface 96 operable for the user to identify specific values 98 of data desired for testing, such as a specific customer record or range of data to be obtained for testing purposes. The third user interface 96 is provided with a key input 100 and a tables input 102 for entering the key or index field related to the data to be obtained from the database, as well as the table related to the key field. The user may input key 100 and value 98 into input fields 104 for processing by the data loading tool 10. In some embodiments, the table currently selected in the second user interface 94 may be automatically displayed in the input field 104 associated with the table 102 of the third user interface 96.

The graphical user interface 90 may also be provided with functionality to enable the user to select specific processes and features of the data loading tool 10 such as an initialize 106 selection. For example, when the user selects initialize 106, having previously selected the database and tables from the first and second user interfaces 92 and 94, the data loading tool 10 is operable to generate the tables list 32. Based on the input of the third user interface 96, the data loading tool 10 is further operable to generate the load list 34 substantially as described herein.

The graphical user interface 90 may also enable the user to select to generate control files 108, extract data 110, and load data 112 corresponding to the control generator 18, extractor component 20, and loader component 22, respectively. It will be appreciated that a number of additional system functions and features described herein may also be provided via the graphical user interface 90, which will suggest themselves to one of ordinary skill in the art when provided with the present disclosure.

While several embodiments have been provided in the present disclosure, it should be understood that the data loading tool may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by on skilled in the art and could be made without departing from the spirit and scope disclosed herein.

What is claimed is:

1. A data loading tool stored on a computer readable medium for loading a target database, comprising:
    an initialization component that obtains a tables list that identifies tables of a source database, wherein an order in which the tables are listed in the tables list identifies a relational association of the tables in the source database;
    the initialization component further receives requested test data, identifies a first table in the tables list, searches the first table by a primary key of the first table to locate, identifies at least one secondary key of the first table, and identifies a first data that is related to the requested test data by associating the at least one secondary key of the first table with the location of the requested test data in the primary key of the first table, the initialization component further identifies a second table in the tables list with a primary key of the second table that is the at least one secondary key of the first table, identifies at least one secondary key of the second table, and identifies second data that is related to the requested data by associating the at least one secondary key of the second table with a location of the first data in the primary key of the second table,
    the initialization component further generates a load file that maintains a record of tables, keys, and data identified by the initialization component in an order that maintains a relational integrity of the source database;
    a control generator that generates at least one control file related to the source database;
    an extractor component that extracts data from the source database based on the load file; and
    a loader component that loads the data extracted by the extractor component into the target database utilizing the at least one control file, wherein the data loaded into the target database maintains the relational integrity of the source database.

2. The data loading tool of claim 1, wherein the control generator generates a plurality of control files, at least one of the control files having information related to a structure of the source database.

3. The data loading tool of claim 1, wherein the at least one of the control file generated by the control generator is further defined as a data file with data structures that are void of data and wherein the extractor component extracts data from the database and writes the data to the data structures of the data file.

4. A method of loading a target database, comprising:
    providing an indication of data that is desired to be loaded in the target database;
    providing a table list identifying a plurality of tables of a source database in an order specifying a relational aspect between the plurality of tables;
    identifying a first table in the tables list;
    searching the first table by a primary key of the first table to locate a first portion of the data that is desired to be loaded in the target database;
    identifying a secondary key of the first table;
    associating the secondary key of the first table with the location of the first portion of data in the primary key of the first table to identify a second portion of data that is to be loaded in the target database;
    identifying a second table in the tables list that is relationally associated with the first table;
    identifying a secondary key of the second table;
    associating the secondary key of the second table with a location of the second portion of data in a primary key of the second table to identify a third portion of data that is to be loaded in the target database;
    generating a load file that maintains a record of tables, keys, and data that have been identified in an order that maintains a relational integrity of the source database;
    generating a control file based on the source database and a data file;
    extracting data from the source database to the data file in the order specified in the load file; and
    loading the data from the data file to the target database using the control file and the table list, wherein the data loaded to the target database maintains the relational integrity of the source database.

5. The method of claim 4, wherein providing the table list further comprises:
    providing a graphical user interface identifying the plurality of tables of the database;
    selecting at least one of the tables provided in the graphical user interface; and providing the selected at least one table in the table list, wherein the selected at least one table in the table list is the first table.

6. The method of claim 4, wherein providing the indication of data that is desired to be loaded further comprises:
providing an input portion of a graphical user interface that receives input; and
inputting the indication of data that is desirably loaded in the target database into the input portion of the graphical user interface.

7. The method of claim 4, wherein the control file is based on at least a portion of a structure of the source database.

8. The method of claim 4, wherein the second key of the first table is a primary key of the second table.

9. A method of testing an application using a test database, comprising:
providing a table list identifying at least some of the tables of a source database;
generating a load list including a table name related to at least one of the tables in the table list, a key name related to a primary key of the at least one table and a portion of data associated with the primary key, using the primary key and the portion of data to identify a secondary key of the at least one table and a second portion of data in the at least one table, identifying another of the tables in the table list with the secondary key as a primary key of the other table and the second portion of data associated with the primary key of the other table, using the primary key of the other table and the second portion of data to identify a secondary key of the other table and a third portion of data in the other table, wherein the load list further includes a table name of the other table in the table list, a key name related to the primary key of the other table, and the second portion of data associated with the primary key of the other table;
generating at least one control file based on a structure of the source database;
extracting at least some of the data from the source database to a data file using the load list; and
loading the at least some of the data from the data file to the test database based on the load list and using the at least one control file;
testing the application using the test database.

10. The method of claim 9, wherein the portion of data and the second portion of data is further defined as associated with a data desirable for testing via the test database.

11. The method of claim 9, further comprising associating the secondary key of the at least one table with the primary key of the other table based on a relational association of the at least one table and the other table of the source database.

12. The method tool of claim 9, further comprising providing a plurality of key names and searching the at least one table for one of the plurality of key names to locate the secondary key.

13. The data loading tool of claim 1, wherein the test data related information is one of the primary key of the first table or the data related to the primary key of the first table.

14. The data loading tool of claim 1, wherein the initialization component further identifies a plurality of secondary keys of the first table, and for each of the plurality of secondary keys, identifies data that is related to the requested test data by associating a corresponding one of the plurality of secondary keys with the location of the requested data in the primary key of the first table.

15. The data loading tool of claim 1, wherein the initialization component further identifies a third table in the tables list relationally associated with the second table, identifies a secondary key of the third table, and identifies third data that is related to the requested test data by associating the secondary key of the third table with a location of the second data in a primary key of the third table.

16. The method of claim 7, wherein the data file initially includes data structures for the data that is desirably loaded in the target database in accordance with the structure of the source database, and wherein the data extractor populates the data structures of the data file.

17. The method of claim 4, wherein the indication of data that is desired to be loaded in the target database is the first portion of the data that is desired to be loaded in the target database.

18. The method of claim 4, wherein the indication of data that is desired to be loaded in the target database is the primary key of the first table.

19. The method of claim 9, wherein generating the load list further includes identifying a third table in the table list with the secondary key of the second table as a primary key of the third table and the third portion of data associated with the primary key of the third table, using the primary key of the third table and the third portion of data to identify a secondary key of the third table and a fourth portion of data in the third table, wherein the load list further includes a table name of the third table in the table list, a key name related to the primary key of the third table, and the third portion of data associated with the primary key of the third table.

* * * * *